US012112687B2

(12) United States Patent
Childress et al.

(10) Patent No.: US 12,112,687 B2
(45) Date of Patent: Oct. 8, 2024

(54) DYNAMIC DISPLAY FOR IMAGE-ENABLED CLOTHING

(71) Applicant: Kyndryl, Inc., New York, NY (US)

(72) Inventors: Rhonda L. Childress, Austin, TX (US); Stan Kevin Daley, Espanola, NM (US); Jeremy R. Fox, Georgetown, TX (US); Michael Bender, Rye Brook, NY (US)

(73) Assignee: Kyndryl, Inc., New York, NY (US)

( * ) Notice: Subject to any disclaimer, the term of this patent is extended or adjusted under 35 U.S.C. 154(b) by 219 days.

(21) Appl. No.: 17/544,020

(22) Filed: Dec. 7, 2021

(65) Prior Publication Data

US 2023/0178002 A1 Jun. 8, 2023

(51) Int. Cl.
*G09G 3/32* (2016.01)
*A41D 27/08* (2006.01)

(52) U.S. Cl.
CPC ............... *G09G 3/32* (2013.01); *A41D 27/08* (2013.01); *G09G 2340/0464* (2013.01); *G09G 2370/022* (2013.01)

(58) Field of Classification Search
None
See application file for complete search history.

(56) References Cited

U.S. PATENT DOCUMENTS

| | | | |
|---|---|---|---|
| 8,107,940 | B1 | 1/2012 | Jackson |
| 8,626,586 | B1 | 1/2014 | Biere et al. |
| 8,639,572 | B1 | 1/2014 | Barnes et al. |
| 8,712,797 | B1 | 4/2014 | Bezdek et al. |
| 9,175,930 | B1 | 11/2015 | Pezeshkian et al. |

(Continued)

FOREIGN PATENT DOCUMENTS

| | | |
|---|---|---|
| JP | 2005127651 | 5/2005 |
| WO | 2005091258 | 9/2005 |

(Continued)

OTHER PUBLICATIONS

Mell et al., "The NIST Definition of Cloud Computing", NIST, Special Publication 800-145, Sep. 2011, 7 pages.

(Continued)

*Primary Examiner* — Yi Wang
(74) *Attorney, Agent, or Firm* — Dan Housley; Andrew M. Calderon; Calderon Safran & Wright P.C.

(57) ABSTRACT

Systems and methods provide dynamic adjustment of content displayed on image-enabled clothing articles to address obstructed visibility of the content. In embodiments a method includes determining, by a computing device, movement of at least a portion of an image-enabled clothing article based on real-time sensor data from sensors of the image-enabled clothing article; determining, by the computing device, that a view of at least a portion of image content displayed on the image-enabled clothing article is obstructed based on the determined movement, parameters of the image-enabled clothing article and image display information of the image-enabled clothing article; and generating, by the computing device, image instructions that cause the display of the image content on the image-enabled clothing article to move from a first area of the image-enabled clothing article to a second area of the image-enabled clothing article.

19 Claims, 9 Drawing Sheets

(56) References Cited

U.S. PATENT DOCUMENTS

| | | | |
|---|---|---|---|
| 9,378,516 | B2 | 6/2016 | Aldrey et al. |
| 9,680,944 | B2 | 6/2017 | Wang et al. |
| 9,818,214 | B2 | 11/2017 | Cincotti et al. |
| 10,423,941 | B1 | 9/2019 | Turley et al. |
| 10,475,099 | B1 | 11/2019 | Nomula et al. |
| 10,502,532 | B2 | 12/2019 | Bender et al. |
| 10,755,310 | B2 | 8/2020 | Bender et al. |
| 2002/0010589 | A1 | 1/2002 | Nashida et al. |
| 2002/0029189 | A1 | 3/2002 | Titus et al. |
| 2002/0090131 | A1 | 7/2002 | Alden |
| 2003/0114233 | A1 | 6/2003 | Hiei |
| 2004/0036006 | A1 | 2/2004 | Dowling |
| 2005/0080775 | A1 | 4/2005 | Colledge et al. |
| 2006/0259924 | A1 | 11/2006 | Boortz |
| 2007/0034774 | A1 | 2/2007 | Blake |
| 2007/0038508 | A1 | 2/2007 | Jain et al. |
| 2009/0154777 | A1 | 6/2009 | Cincotti et al. |
| 2010/0077017 | A1 | 3/2010 | Martinez et al. |
| 2010/0122286 | A1 | 5/2010 | Begeja et al. |
| 2010/0185501 | A1 | 7/2010 | Chou et al. |
| 2010/0234106 | A1 | 9/2010 | Kojima et al. |
| 2010/0289665 | A1 | 11/2010 | Dickie et al. |
| 2011/0166932 | A1 | 7/2011 | Smith et al. |
| 2011/0270685 | A1 | 11/2011 | Marks et al. |
| 2011/0282906 | A1 | 11/2011 | Wong |
| 2012/0016735 | A1 | 1/2012 | Park et al. |
| 2012/0062571 | A1 | 3/2012 | Malek |
| 2012/0072286 | A1 | 3/2012 | Kilar et al. |
| 2012/0091111 | A1 | 4/2012 | Schwarz |
| 2012/0116882 | A1 | 5/2012 | Sanghavi et al. |
| 2012/0154196 | A1 | 6/2012 | Cincotti et al. |
| 2012/0182276 | A1 | 7/2012 | Kee |
| 2012/0254150 | A1 | 10/2012 | Gupta |
| 2012/0318129 | A1 | 12/2012 | Jackson et al. |
| 2013/0027227 | A1 | 1/2013 | Nordstrom |
| 2013/0059526 | A1 | 3/2013 | Moore et al. |
| 2013/0080943 | A1 | 3/2013 | Reeves et al. |
| 2013/0083999 | A1 | 4/2013 | Bhardwaj et al. |
| 2013/0086607 | A1 | 4/2013 | Tom et al. |
| 2013/0163867 | A1 | 6/2013 | Cincotti et al. |
| 2013/0263179 | A1 | 10/2013 | Dow et al. |
| 2014/0010449 | A1 | 1/2014 | Haaramo et al. |
| 2014/0125506 | A1 | 5/2014 | Sjolund |
| 2014/0143035 | A1 | 5/2014 | Reardon et al. |
| 2014/0244658 | A1 | 8/2014 | Mahmud et al. |
| 2014/0344718 | A1 | 11/2014 | Rapaport et al. |
| 2015/0142575 | A1 | 5/2015 | Gerard et al. |
| 2015/0143601 | A1 | 5/2015 | Longinotti-Buitoni et al. |
| 2015/0178988 | A1 | 6/2015 | Montserrat Mora et al. |
| 2015/0241176 | A1 | 8/2015 | Schwarz |
| 2015/0320588 | A1 | 11/2015 | Connor |
| 2015/0324181 | A1 | 11/2015 | Segal |
| 2015/0358557 | A1 | 12/2015 | Terre et al. |
| 2015/0363816 | A1 | 12/2015 | Poglitsch |
| 2016/0171503 | A1 | 1/2016 | Nelsen |
| 2016/0066716 | A1 | 3/2016 | Rao |
| 2016/0132903 | A1 | 5/2016 | Bansal et al. |
| 2016/0354232 | A1 | 12/2016 | Rozental |
| 2016/0381158 | A1 | 12/2016 | Curtis et al. |
| 2017/0027257 | A1 * | 2/2017 | Northup ................. A42B 1/004 |
| 2017/0076476 | A1 | 3/2017 | Nakajo et al. |
| 2017/0140574 | A1 | 5/2017 | Sugita et al. |
| 2017/0244951 | A1 * | 8/2017 | Ha ........................ G06T 19/006 |
| 2017/0301160 | A1 | 10/2017 | Somani et al. |
| 2017/0316296 | A1 | 11/2017 | Ashiura |
| 2017/0352058 | A1 | 12/2017 | Bender et al. |
| 2018/0373293 | A1 | 12/2018 | Staton et al. |
| 2019/0012331 | A1 | 1/2019 | Zhang et al. |
| 2020/0167831 | A1 | 5/2020 | Jin |

FOREIGN PATENT DOCUMENTS

| | | |
|---|---|---|
| WO | 2012141700 | 10/2012 |
| WO | 2014131021 | 8/2014 |

OTHER PUBLICATIONS

Vancouver, B.C., "SmartCamo Color Changing Camouflage Materials presented by Hyperstealth CEO at Brussels International Camouflage Symposium", http://hyperstealth.com/Brussels/index.html, Dec. 1, 2010, 4 pages.

YouTube Video, "Security and Internet of Things: A World of Possibilities (Full Version dated Nov. 2015)", https://www.youtube.com/watch?v=AzS4v8xQUQI, IBM Academy of Technology Channel, Nov. 17, 2015, 3 pages.

Anonymous, "I luminate", http://iluminate.com, Accessed Feb. 25, 2016, 5 pages.

Anonymous, "LIBER8 Technology", http://www.liber8tech.com, Accessed Feb. 25, 2016, 2 page.

Zhou, "Security/Privacy of Wearable Fitness Tracking IoT Devices", Sep. 26, 2015, 6 pages.

Seneviratne, "A Survey of Wearable Devices and Challenges", IEEE, Jul. 26, 2017, 52 pages.

Schmidt et al., "Interacting with 21st-Century Computers", IEEE, Jan. 2012, 10 pages.

Anonymous, "Textile sensors for wearable applications: a comprehensive review", https://link.springer.com/article/10.1007/s10570-020-03215-5, SpringerLink, May 13, 2020, 62 pages.

Anonymous, "Human billboard", https://en.wikipedia.org/wiki/Human_billboard, Wikipedia, Aug. 26, 2021, 8 pages.

Smith, "Work Clothes, Reimagined for an Age of Wearable Tech", https://www.wsj.com/articles/work-clothes-reimagined-for-an-age-of-wearable-tech-11577981068, Jan. 2, 2020, 3 pages.

Kaist, "Highly flexible, wearable displays", https://www.sciencedaily.com/releases/2017/08/170824094022.htm, Science Daily, Aug. 24, 2017, 3 pages.

* cited by examiner

DYNAMIC DISPLAY FOR IMAGE-ENABLED CLOTHING

BACKGROUND

Aspects of the present invention relate generally to displaying images on image-enabled clothing articles and, more particularly, to dynamic displays for image-enabled clothing articles.

Image-enabled clothing is a growing technology area, having applications in fashion, advertising, and sporting goods, for example. One use of image-enabled clothing is in providing camouflage to enable a user to blend into their environment. Another use of image-enabled clothing is to utilize clothing articles as localized billboards for advertising to nearby consumers. In general, an image-enabled clothing article may include a special purpose controller or processor configured to control the display of images (e.g., text or pictures) on one or more display areas of the image-enabled clothing article.

SUMMARY

In a first aspect of the invention, there is a computer-implemented method including: determining, by a computing device, movement of at least a portion of an image-enabled clothing article based on real-time sensor data from sensors of the image-enabled clothing article; determining, by the computing device, that a view of at least a portion of image content displayed on the image-enabled clothing article is obstructed based on the determined movement, parameters of the image-enabled clothing article, and image display information of the image-enabled clothing article; and generating, by the computing device, image instructions that cause the display of the image content on the image-enabled clothing article to move from a first area of the image-enabled clothing article comprising a first set of portions to a second area of the image-enabled clothing article comprising a second set of portions.

In another aspect of the invention, there is a computer program product including one or more computer readable storage media having program instructions collectively stored on the one or more computer readable storage media. The program instructions are executable by a computing device to: determine movement of at least a portion of an image-enabled clothing article based on real-time sensor data from sensors of the image-enabled clothing article; determine that a view of at least a portion of image content displayed on the image-enabled clothing article is obstructed based on the determined movement, a location of the image content displayed and locations of the sensors on the image-enabled clothing article; and in response to the determining that the view of the at least a portion of the image content displayed on the image-enabled clothing article is obstructed, generate image instructions that cause the display of the image content on the image-enabled clothing article to move from a first area of the image-enabled clothing to a second area of the image-enabled clothing article.

In another aspect of the invention, there is system including a processor, a computer readable memory, one or more computer readable storage media, and program instructions collectively stored on the one or more computer readable storage media. The program instructions are executable by a computing device to: determine movement of at least a portion of an image-enabled clothing article based on real-time sensor data from sensors of the image-enabled clothing article; determine that visibility of at least a portion of image content displayed on a first area of the image-enabled clothing article is obstructed from a first point of view based on the determined movement; and in response to the determining that the visibility of the at least a portion of the image content displayed on the image-enabled clothing article is obstructed, generate image instructions that cause the image-enabled clothing article to perform a counter movement protocol to display the image content in a second area of the image-enabled clothing article, resulting in displayed image content that is fully visible from the first point of view.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
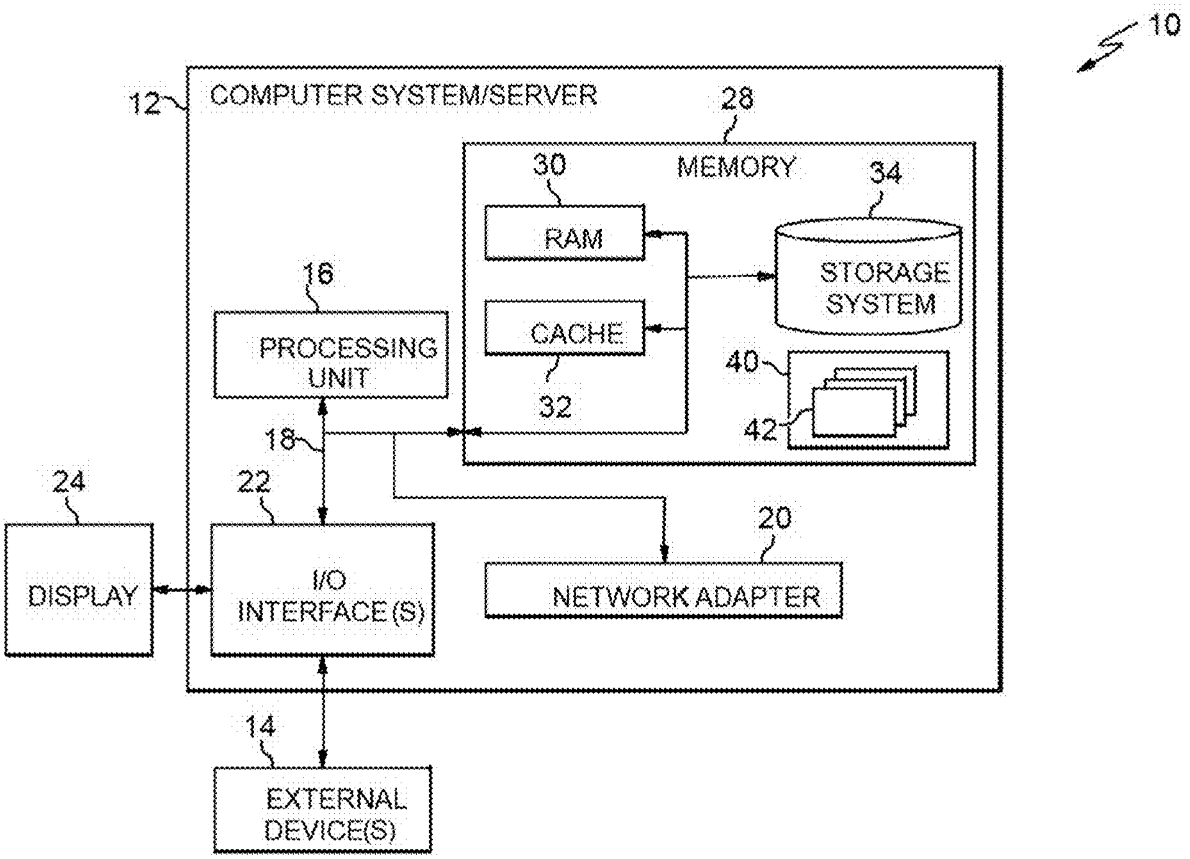
FIG. 1 depicts a cloud computing node according to an embodiment of the present invention.

Aspects of the present invention relate generally to displaying images on image-enabled clothing articles and, more particularly, to dynamic displays for image-enabled clothing articles. Embodiments of the invention provide a method of changing what is displayed on an image-enabled article based on movement of a display portion(s) of the article. In implementations, by utilizing fifth generation (5G) enabled sensors and gyroscopes, a system can determine movement and speed of portions of an image-enabled clothing article and change the location and/or perspective of an image or images displayed thereon.

Existing image-enabled clothing articles may display images that change over time based on outside input, such as input from advertisers, or image capture devices (e.g., local cameras). However, movement of the medium (e.g., material) of the image-enabled clothing article may interfere with the display of images from the perspective of viewers of the display. Additionally, as a person wearing the image-enable clothing moves, a time lag can be too long to make it practical for a viewer to focus on an image displayed on the image-enabled clothing. For a camouflaging use case, that could mean that the wrong pattern is displayed by the image-enabled clothing, which can reduce the effectiveness of the image-enabled clothing for camouflage purposes. In the case of dynamic advertising, the movement of the material of the image-enabled clothing article, or of the person wearing the image-enabled clothing article, can limit what others viewing the image-enabled article can see or focus on as the person moves.

Implementations of the invention provide a technical solution to the technical problem of image obstruction (reduced display quality) on image-enabled clothing articles due to movement of the articles. In embodiments, a method and system to modify the location of displayable content on image-enabled clothing articles (e.g., garments) based on movement of the clothing article is provided, enabling: registration of sensors and location of sensors on an image-enabled clothing article, wherein the image-enabled clothing article is configured to display content; detection of motion of the image-enabled clothing article; determination of motion that impacts one or more display areas of the image-enabled clothing article, wherein the impact changes (obstructs, obscures, modifies) the display; and display of the content at a different location or otherwise adjusting the display based on the determined movement, wherein the different location or adjustment of the display is adapted to maintain visibility of the displayed content. One exemplary scenario is when a display on a sleeve of a garment is impacted by the wearer bending their arm at the elbow, thus obscuring the content displayed on the sleeve.

In implementations, a method and system enable the utilization of location (e.g., 5G enabled sensors) and gyroscope sensors to determine motion of the image-enabled clothing article. In embodiments, the method and system further enable adjustment in the number of displayable areas or panels based on the movement of the image-enabled clothing article. In aspects, the adjustment of the displayable areas or panels is based on an overlapping of displayable areas or panels, wherein the adjustment is configured to ensure images are not displayed on areas hidden from view (obscured from view). In implementations, displayed content is rotated to match a determined degree of movement of the image-enabled clothing article, or a portion thereof. In some implementations, the quality of content displayed is adjusted based on the display capabilities of the image-enabled clothing article, utilizing a different display area or panel.

It should be understood that, to the extent implementations of the invention collect, store, or employ personal information provided by, or obtained from, individuals (for example, participant parameters), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
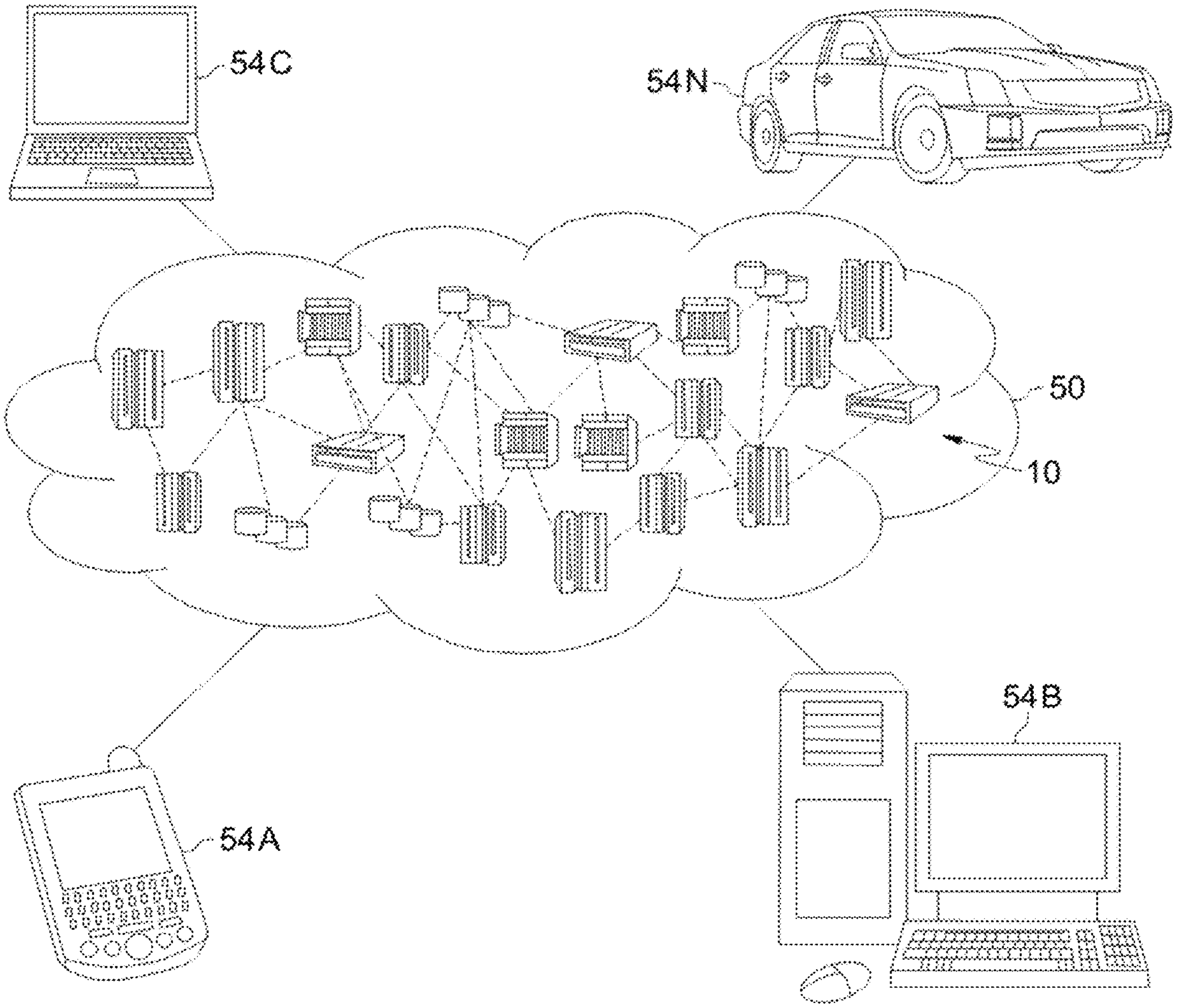
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
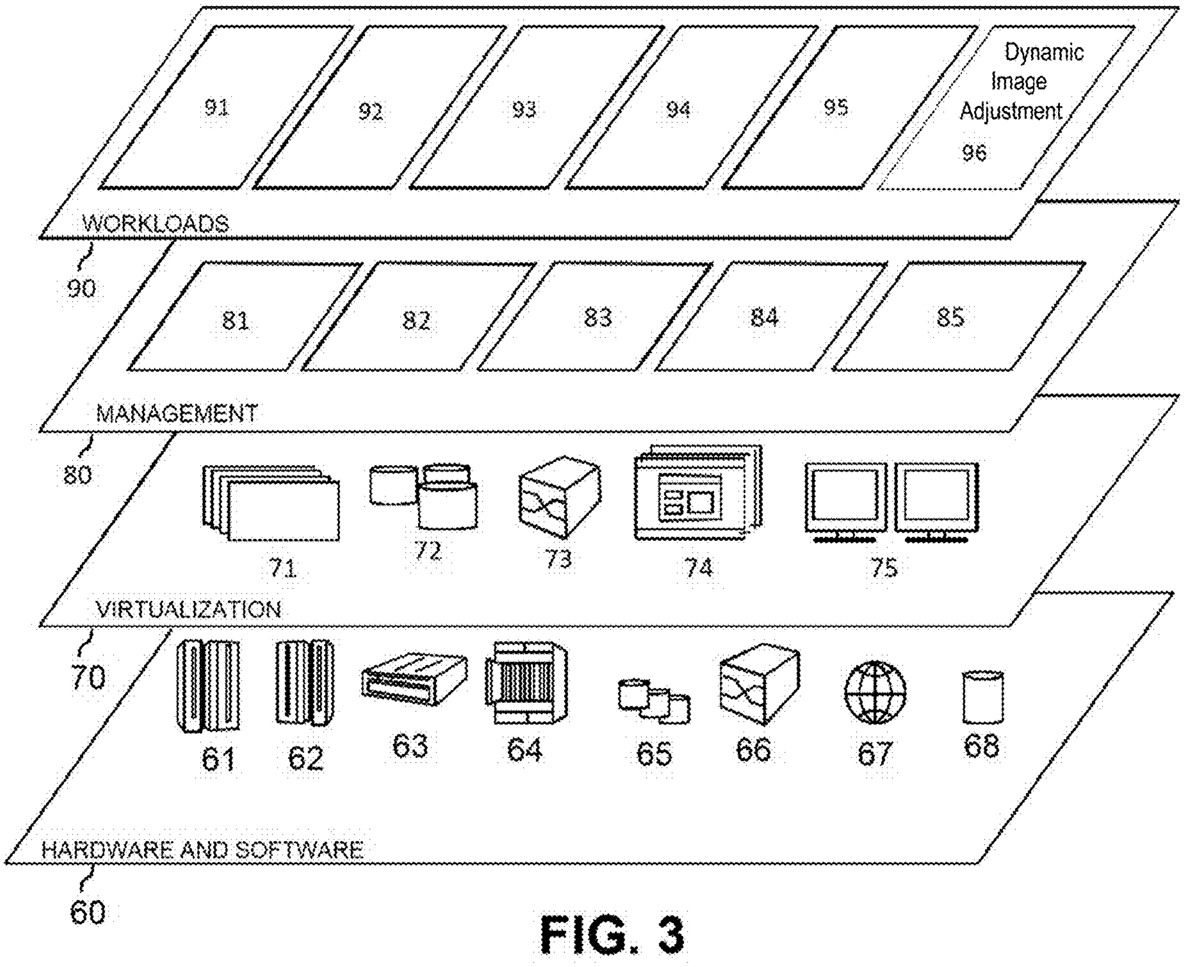
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic image adjustment 96.

Implementations of the invention may include a computer system/server 12 of FIG. 1 in which one or more of the program modules 42 are configured to perform (or cause the computer system/server 12 to perform) one of more functions of the dynamic image adjustment 96 of FIG. 3. For example, the one or more of the program modules 42 may be configured to: determine movement of at least a portion of an image-enabled clothing article based on real-time sensor data from sensors of the image-enabled clothing article; determine that visibility of at least a portion of image content displayed on a first area of the image-enabled clothing article is obstructed from a first point of view based on the determined movement; and in response to the determining that the visibility of the at least a portion of the image content displayed on the image-enabled clothing article is obstructed, generate image instructions that cause the image-enabled clothing article to perform a counter movement protocol to display the image content in a second area of the image-enabled clothing article, resulting in displayed image content that is fully visible from the first point of view.

Figure 4:
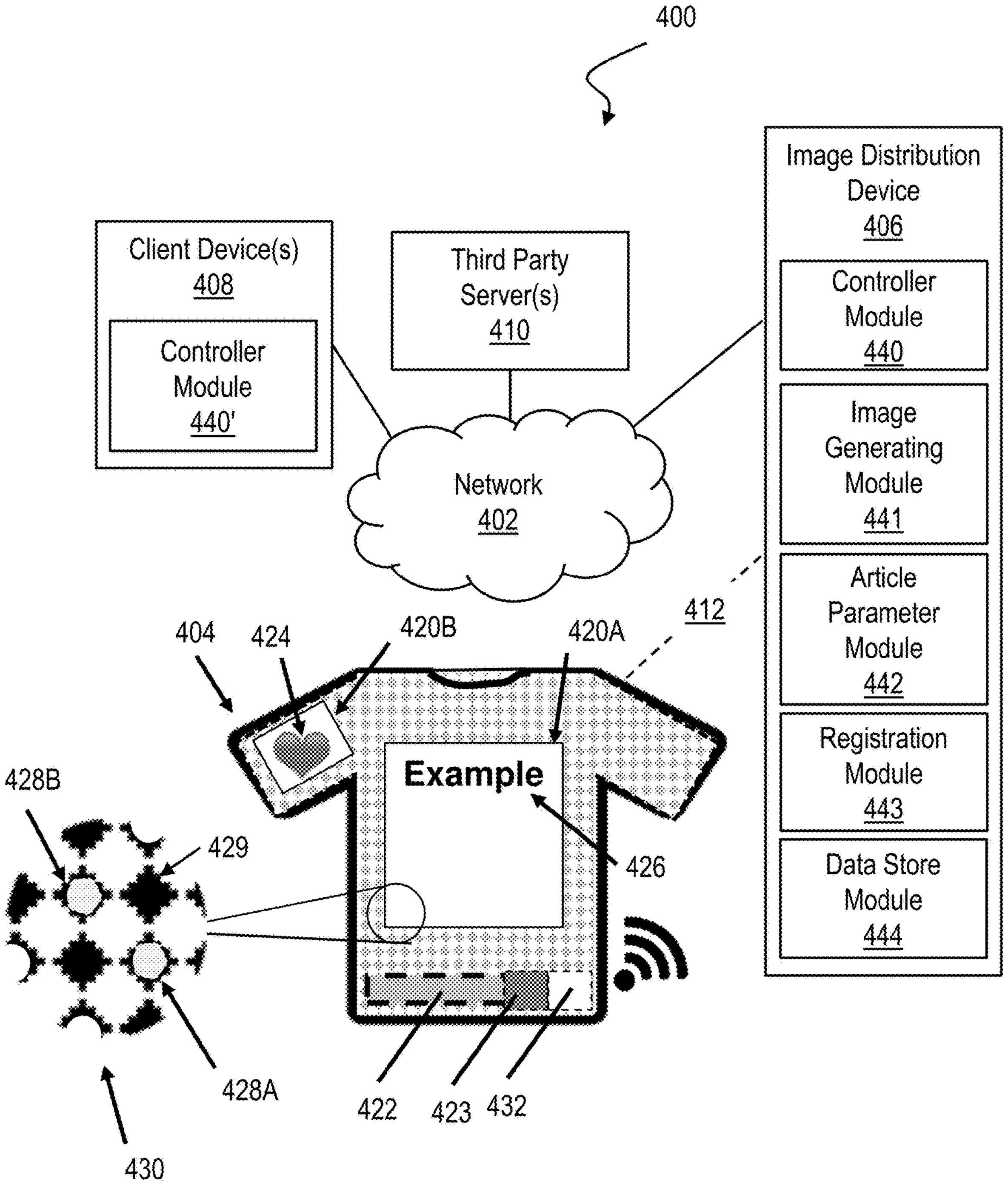
FIG. 4 shows a block diagram of an exemplary environment in accordance with aspects of the invention.

FIG. 4 shows a block diagram of an exemplary image displaying environment 400 in accordance with aspects of the invention. In embodiments, the image displaying environment 400 includes a network 402 enabling communication between an image-enabled clothing article 404 and an image distribution device 406, one or more client devices 408, and/or one or more third party servers 410. Each of the image distribution device 406, the one or more third party devices 408, and the one or more third party servers 410, may comprise the computer system/server 12 of FIG. 1, or elements thereof.

An image-enabled clothing system according to embodiments of the invention may comprise various configurations. In a first exemplary configuration, the image distribution device 406 is a server in communication with a client device 408 of a participant, wherein the client device 408 is in communication with or associated with the image-enabled clothing article 404. In such configurations, the image distribution device 406 may send image instructions to the client device 408 of the participant, and the client device 408 may communicate the image instructions to the image-enabled clothing article 404.

In another exemplary configuration, the image distribution device 406 is a personal device of the participant, and is in communication with or associated with the image-enabled clothing article 404. In this configuration, the image distribution device 406 communicates image instructions to the image-enabled clothing article 404.

In yet another exemplary configuration, the image distribution device 406 is incorporated into the image-enabled clothing article 404 (as represented by dashed line 412), such that image instructions are generated by an image distribution device 406 of the image-enabled clothing article 404 itself. Other configurations may be utilized, and the present invention is not intended to be limited to the example configurations discussed herein.

The image distribution device 406 and the one or more third party devices 408 may be computing nodes 10 in the cloud computing environment 50 of FIG. 2. In implementations, the image-enabled clothing article 404 and/or the one or more client devices 408 are local computing devices used by cloud consumers in the cloud computing environment 50 of FIG. 2. In embodiments, an image-enabled clothing system comprises one or more image-enabled clothing articles 404, or one or more image-enabled clothing articles 404 and one or more client devices 408 (e.g., mobile device in communication with an image-enabled clothing article).

In embodiments, the image-enabled clothing article 404 comprising a wearable article including one or more display areas (billboards) 420A, 420B comprising one or more display portions or panels. The term image-enabled clothing article refers to wearable articles of clothing or accessories (e.g., shirts, pants, dresses, hats, vests, jackets, shoes, etc.) capable of displaying a pictorial and/or text-based image in one or more display areas. In embodiments, the image-enabled clothing article 404 comprises a panel or grid of light emitting diodes (LEDs) wired such that they are controllable by a processor represented at 422. The processor 422 may be in communication with a memory 423, and one or more one or more program modules stored therein, such as program modules 42 described with respect to FIG. 1.

As an example, the image-enabled clothing article 404 may include one or more LED display panels attached to an under layer of material, and an overlay of one or more layers of opaque material to hide the LEDs and create one or more image-display areas (e.g., 420A, 420B). The LEDs may be mounted individually, in a strip, or in a grid, such that LEDS may be selectively lighted by the processor 422 to create an image (e.g., a pixel image) viewable on the image-enabled clothing article 404, as depicted by image 424 and text 426.

In implementations, the image-enabled clothing article 404 includes one or more sensors (e.g., 5G enabled sensors and gyroscopes) represented at 428A and 428B, for example. In implementations, the one or more sensors (e.g., 428A, 428B) are configured in a grid 430 over one or more display areas (e.g., 420A, 420B) and are configured to determine movement of the image-enabled clothing article 404 with respect to an external point (e.g., a fixed point). In embodiments, the grid 430 comprises a plurality of LEDs 429, which may be layered on top of, or positioned adjacent to sensors 428A, 428B. In embodiments, the one or more sensors (e.g., 428A, 428B) are configured to determine movement of portions of the image-enabled clothing article 404 with respect to other portions of the image-enabled clothing article 404. For example, in implementations, the one or more sensors 428A, 428B of the image-enabled clothing article 404 provide information enabling the generation of a three-dimensional contour grid or map showing a three-dimensional arrangement of material of the image-enabled clothing article 404.

In embodiments, the image-enabled clothing article 404 further includes a communication module represented at 432 configured to communicate with one or more remote devices such as the one or more client devices 408 and the image distribution device 406. In embodiments, the processor 422 of the image-enabled clothing article 404 is configured to receive control instructions through communication of the communication module 432 with a control module 440 of the image distribution device 406 (e.g., as cloud-based server) and/or a control module 440' of the client device 408. In embodiments, the communication module 432 uses Bluetooth to communicate with the controller module 440' of a client device 408 (e.g., mobile device of a wearer of the image-enabled clothing article 404). In implementations, the communication module 432 enables Internet communication via the network 402 with the image distribution device 406, client device(s) 408 and/or third-party server(s) 410.

In embodiments, the image distribution device 406 comprises one or more modules, each of which may comprise one or more program modules such as program modules 42 described with respect to FIG. 1. In the example of FIG. 4, the image distribution device 406 includes the controller module 440, an image generating module 441, an article parameter module 442, a registration module 443 and a data store module 444, each of which may comprise one or more program modules (e.g., program module(s) 42 of FIG. 1). Likewise, the controller module 440' of each client device 408 may comprise one or more program modules such as program modules 42 described with respect to FIG. 1.

In aspects of the invention, the image generating module 441 is configured to generate instructions for displaying a particular image or images (e.g., images 424, 426) on the image-enabled clothing article 404. Examples of images includes advertising images (e.g., based on display information from one or the third-party servers 410), fashion images, and camouflage patterns.

In implementations, the article parameter module 442 is configured to store participant information, including user parameters and image-enabled clothing parameters. User parameters may include characteristics such as height (e.g., indicating how high a display will be positioned) and number and types of image-enabled clothing articles 404 owned by a wearer/user. Image-enabled clothing parameters may include image display capabilities (e.g., location and number of sensors, types of sensors, size of image display areas, dimensions of a clothing article, number of image display areas, configuration of image display areas, pixels, colors available for display, data storage capabilities, etc.), registered devices, or other information regarding an image-enabled clothing system. In implementations, the client device 408 is configured to store participant and/or image-enabled clothing parameters.

In embodiments, the registration module 443 is configured to obtain information from participants regarding the participant's image-enabled clothing systems, such as participant parameters and/or image-enabled clothing parameters. The registration module 443 may store information from participants in one or more databases via the data store module 444. In implementations, the data store module 444 is configured to store image information (e.g., instructions for generating an image) in one or more databases via the data store module 444.

In embodiments, the one or more third party servers 410 are configured to provide display information (e.g., advertising information) to the image distribution device 406 and/or the one or more client devices 408 for use by the respective controller modules 440, 440' to cause the display of one or more images (e.g., 424, 426) on the image-enabled clothing article 404.

The image-enabled clothing article 404, the image distribution device 406, the one or more client devices 408, and the one or more third party servers 410 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4.

Figure 5:
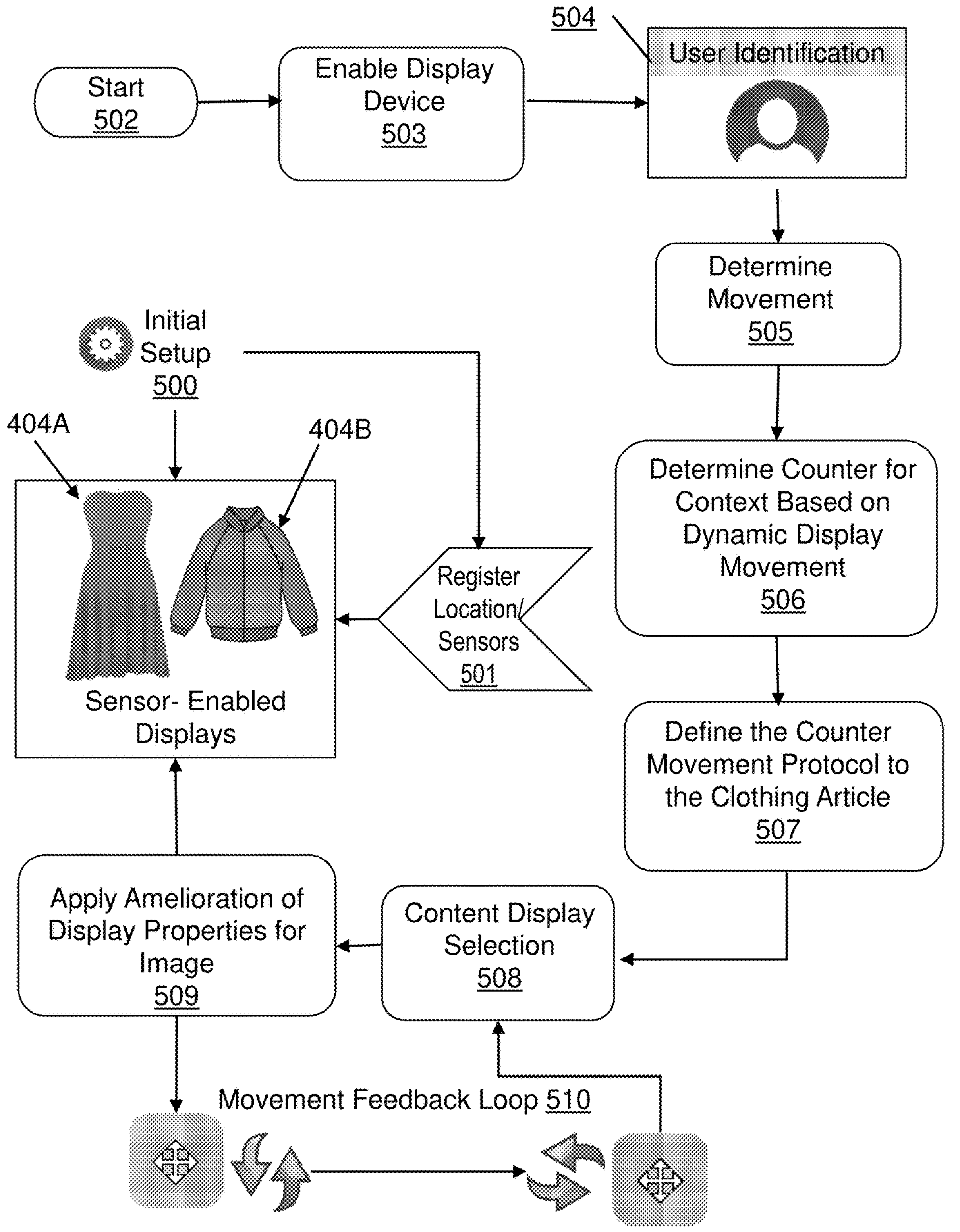
FIG. 5 is a flowchart diagram illustrating process steps according to embodiments of the invention.

FIG. 5 is a flowchart diagram illustrating process steps according to embodiments of the invention. Steps of FIG. 5 may be carried out in the environment of FIG. 4 and are described with reference to elements depicted in FIG. 4.

In the example of FIG. 5, an initial setup 500 is performed to register one or more image-enabled clothing articles (e.g., 404A, 404B) with a controlling device (e.g., image distribution device 406). In implementations, the initial setup 500 includes the registration of parameters of an image-enabled clothing article (e.g., 404A, 404B), including type of sensors (e.g., 428A, 428B) and location of the sensors. In embodiments, the parameters enable the image distribution device 406 to determine locations of sensors in relationship to boundaries of the image-enabled clothing article, and enable detection of overlapping areas of the clothing article, thereby enabling the image distribution device 406 to determine when there is reduced visibility of a portion(s) of the clothing article. For example, parameter data may enable determination of overlapping portions of a single garment (e.g., the sleeve of a shirt overlapping a body portion of the shirt) or overlapping portions of respective garments (e.g., a shirt overlapping pants). Sensor types may be location-based sensors, motion-based sensors (e.g., gyroscopes), or a combination of both, for example.

At step 502, an image display event is initiated (e.g., by a wearer/user of an image-enabled clothing article or by a remote or third party (e.g., an advertiser). In implementations, a wearer/user turns on one or more displays of the device through a local controller or through a controller of the client device 408 (e.g., via the controller module 440').

At step 503, an image display function is enabled for one or more displays of the image-enabled clothing article, and the image-enabled clothing article. At step 504, the image distribution device 406 communicates with the image-enabled clothing article (e.g., 404A, 404B) or a related client device 408 and obtains wearer/user identification information (e.g., login information, user parameter data and/or image-enabled clothing article information).

Once the image distribution device 406 recognizes a user, image instructions appropriate for the image-enabled clothing article (e.g., 404A, 404B) may be sent to the image-enabled clothing article (e.g., directly or through the client device 408), causing the image-enabled clothing article to display the image. The image-enabled clothing article obtains sensor data (e.g., real-time sensor data) indicating movement of the image-enabled clothing article or portions thereof. In embodiments, the image-enabled clothing article sends sensor data (e.g., in real time) to the image distribution device 406 (e.g., directly or through the client device 408).

At step 505, the image distribution device 406 determines movement of the image-enabled clothing article (e.g., 404A, 404B), or portions thereof, based on the received sensor data and registration information. In implementations, the image distribution device 406 reads the sensor data (e.g., gyroscope or 5G sensor data) for each enabled sensor, and determines if motion of the image-enabled clothing article causes any new overlaps or other obstructions in display portions of the image-enabled clothing article(s).

At step 506, if the image distribution device 406 determines that movement has caused new image obstructions in display portions of the image-enabled clothing article(s) (e.g., 404A, 404B), the image distribution device 406 dynamically determines, based on context, how to address or counter the movement (dynamic display movement). In implementations, display rules may govern how an overlap or image obstructions is addressed by the image distribution device 406. For example, the manner in which an overlap or obstruction is addressed may differ with different types of obstructions or different portions of the image-enabled clothing article involved in the overlap or obstruction (i.e., context).

In embodiments, the image distribution device 406 defines a counter movement protocol to cause the image-enabled clothing article (e.g., 404A, 404B) to change the manner in which an image is displayed by the image-enabled clothing article based on the determined movement of the image-enabled clothing article and context of an image obstruction. In implementations, the image distribution device 406 determines displayable panels or areas of the image-enabled clothing article(s) that are displaying content (e.g., one or more images) and that require adjustment based on a movement that has occurred. In embodiments, the amount of movement that triggers the generation of a counter movement protocol may be configurable by a user.

In aspects, the image distribution device 406 determines if new display portions of the image-enabled clothing article(s) are needed to display content, and image instructions are generated to implement a counter movement protocol (e.g., move or drag content from one display portion or portions to another display portion or portions). In embodiments, the image distribution device 406 moves content with respect to any point (base point) within 360 degrees of rotation, considering three dimensions. In implementations, the image distribution device 406 determines if displayed image content needs to be reconfigured from a current configuration to another configuration (e.g., by clipping, stretching, or otherwise resizing or reconfiguring the content). In embodiments, image instructions are generated to cause the image-enabled clothing article(s) to re-display original content (e.g., an image(s)) at a new location(s) on the image-enabled clothing article(s).

The counter movement protocol may be based on predetermined display rules and context. For example, in the case where an image is intended to be maintained from a fixed perspective, and the image-enabled clothing article turns 180 degrees from a first position to a second position, the counter movement protocol may cause the image to move from a front of the image-enabled clothing article (e.g., 404A, 404B) to a back of the image-enabled clothing article. In another example, when an arm portion of an image-enabled shirt is blocking a body portion of the image-enabled shirt, the counter movement protocol may rotate, resize, and move the image to unobstructed portions of the arm and/or body of the image-enabled shirt to maintain viewability of the image from a fixed perspective of a viewer.

In embodiments, at step 508, the image distribution device 406 selects a counter movement protocol and sends image instructions to cause the image-enabled clothing article(s) (e.g., 404A, 404B) to implement the protocol. In implementations, there may be more than one possible counter movement protocol, and the image distribution device 406 may select one counter movement protocol based on user-configurable rules.

At step 509, the image-enabled clothing article(s) receives the image instructions from the image distribution device 406 and initiates the instructions (counter movement protocol) to address the movement determined at step 505.

The image distribution device 406 receives new sensor data (e.g., real-time sensor data) from the image-enabled clothing article(s) (e.g., 404A, 404B) implementing the image instructions, and based on knowledge of the current display of image content on one or more display portions of the image-enabled clothing article(s), determines if additional adjustments to the display of the image content (counter movement protocols) are required, as indicated by the movement feedback loop 510.

Based on the above, it can be understood that embodiments of the invention enable image adjustment based on multiple different scenarios or context. In a first example, if a person is reading a text image displayed on an image-enabled shirt and the wearer of the image-enabled shirt turns, the person viewing the display may want to continued reading the display. In this first example, a system according to embodiments of the invention may adjust the text image such that the viewing perspective remains the same with respect to a fixed perspective or position (e.g., a position of the viewer). In a second example, if the front of an image-enabled garment is shorter than the back of the garment and a person turns 180 degrees, a system according to embodiments of the invention may adjust the scale of an image displayed on the front of the garment as it is moved to the back of the garment based on the dimensions of the front and back of the garment (similar to moving an object from a large screen to a small screen). In a third example, based on the position of an image-enabled shirt, if an image is displayed on a side of the shirt, and a sleeve of the shirt is moved to overlay the side of the shirt (thereby obscuring the view of the image), a system according to embodiments of the invention may move the appropriate (i.e., obscured) part of the image display to the sleeve to optimize visibility of the image. FIGS. 6A-8B depict some exemplary use scenarios, as discussed in more detail below.

Figure 6A:
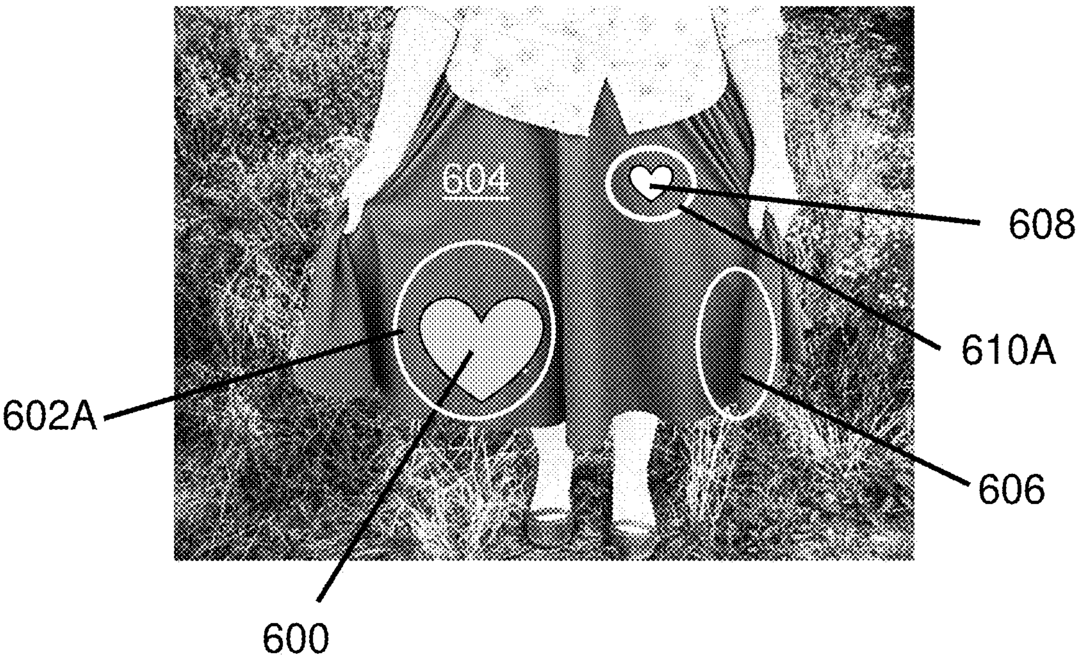
FIG. 6A shows an exemplary image displayed on an unobstructed portion of an image-enabled clothing article in accordance with embodiments of the invention.

FIG. 6A shows an exemplary image displayed on an unobstructed portion of an image-enabled clothing article in accordance with embodiments of the invention. Steps discussed with respect to FIG. 6A may be carried out in the environment of FIG. 4.

In the example of FIG. 6A, a first heart image 600 is displayed on a portion 602A of an image-enabled skirt 604 that is unobstructed by other portions of the image-enabled skirt 604. That is, a surface of the image-enabled skirt 604 within portion 602A is viewable by an observer and is not obstructed by any folds (e.g., fold 606) in the material of the image-enabled skirt 604. A second heart image 608 is displayed on another portion 610A of the image-enabled skirt 604 that is also unobstructed by other portions of the image-enabled skirt 604. It can be understood that available presentation space may change based on a viewer's perspective of the image-enabled skirt 604 and the image-enabled skirt 604, or portions thereof, as those portions move and flow.

Figure 6B:
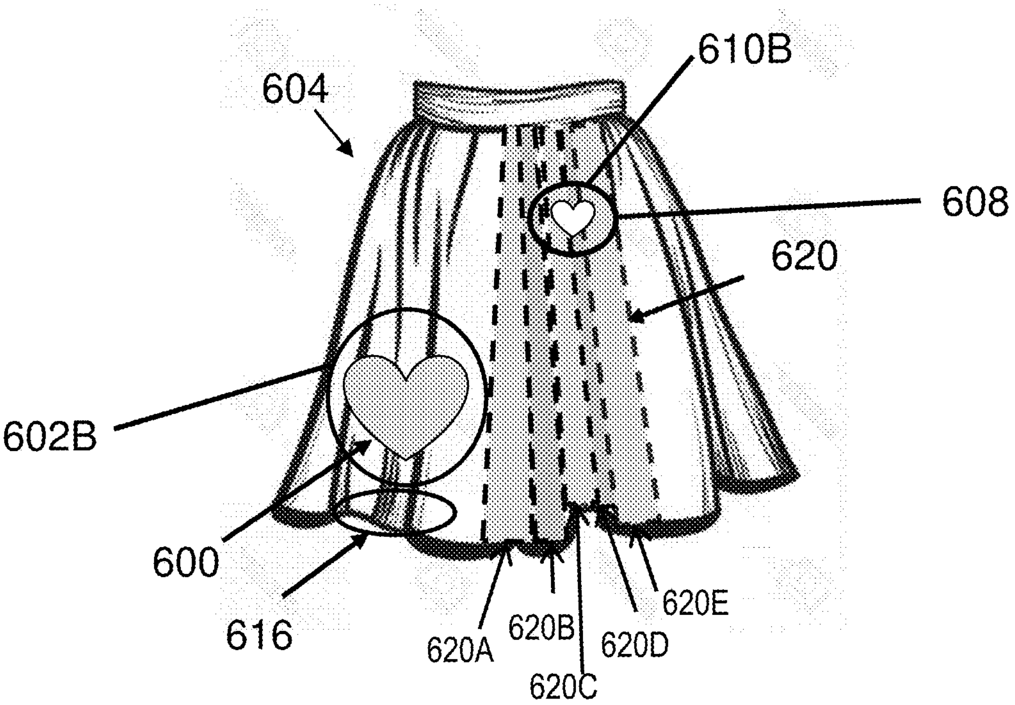
FIG. 6B shows a representation of the image-enabled skirt of FIG. 6A after the application of article-based display adjustment in accordance with embodiments of the invention.

FIG. 6B shows a representation of the image-enabled skirt 604 of FIG. 6A after the application of article-based display adjustment in accordance with embodiments of the invention. Steps discussed with respect to FIG. 6B may be carried out in the environment of FIG. 4.

In the example of FIG. 6B, a system according to embodiments of the invention recognizes predefined virtual panels, slices, or portions 620 of the image-enabled skirt 604, which may be defined by groups of sensors (e.g., sensors 428A, 428B) or by other parameters. In implementations, the size of an image displayed in any given portion 620 is proportional to the available space in that portion 620. In embodiments, a system of the invention may stretch an image within non-rectangular spaces to allow for different sizes of portions 620. In the example of FIG. 6B, exemplary portions 620A-620E are shown. In the example depicted in FIG. 6B, a display surface of the image-enabled skirt 604 comprises a flexible material that can drape in a way that introduces overlapping portions of material or folds (e.g., 616). The material shown includes drapes or folds in the location of both the first heart image 600 (e.g., fold 616) and the second heart image 610 (as depicted through the semi-transparent representations of portions 620C, 620D and 620E). A system according to embodiments of the invention can detect the folds based on registered sensor locations within the image-enabled skirt 604, received sensor data (e.g., gyroscope sensor data), and adjust the display of the first and second heart images 600 and 610 to compensate for the folds in order to provide a clear (unobstructed) view of the images 600 and 608.

In the example of FIG. 6B, the image-enabled skirt 604 acts on image instructions (e.g., from the image distribution device 406) to redistribute pixels that make up the first heart image 610 from a first portion of the image-enabled skirt 604 to a second portion of the image-enabled skirt 604, such that pixels are distributed on only front-facing portions of the material (e.g., not within the folds of the material). Accordingly, a viewer of the image-enabled skirt 604 would see the entire first heart image 600 upon implementation of the image instructions. Alternatively, the image instructions cause the system to move the first heart image 600 and second heart image 608 from a set of one or more predefined portions or panels to another set of one or more predefined portions or panels within a predetermined display area. For example, the second heart icon 608 may first be displayed on panel 620D, and may be moved to panels 620C and 620E if a fold in the fabric of the image-enabled skirt obscured or obstructs the view of panel 620D. In the example of FIG. 6B, a predefined display area comprises a front of the skirt, such that image instructions to address movement of the skirt are restricted to adjusting image content within the bounds of the predefined display area on the front of the skirt.

It should be understood that without the article-based display adjustment in this example, the first heart image 600 would be obscured by folds in the material (e.g., fold 616). That is, the first heart image 600 is displayed on a portion 602B of the image-enabled skirt 604 that would be obstructed by other portions of the image-enabled skirt 604 if article-based display adjustment was not performed in accordance with embodiment of the invention. In other words, a surface of the image-enabled skirt 604 within portion 602B would not be viewable by an observer due to obstruction of the surface by other portions of the image-enabled skirt 604 (e.g., folds 616) absent article-based display adjustment to redistribute the image across one or more display portions or panels to avoid obstruction of the first heart image 600.

While the examples of FIGS. 6A and 6B use a single image-enabled clothing article, embodiments of the invention may apply article-based display adjustment to more than one image-enabled clothing article, wherein any overlap in the articles would be detected by sensor data, and the system would ensure images are not displayed on hidden portions of the articles (e.g., an image-enabled shirt overlaying a top portion of image-enabled pants). In implementations, article-based display adjustment is applied to image-enabled clothing articles of different individuals. In embodiments, the image distribution device 406 causes one or more images to be displayed across the surface of image-enabled clothing articles worn by respective individuals in a group setting. In one example, one or more moving digital images are progressively displayed across the surface of multiple image-enabled clothing articles in a "wave", similar to how individuals perform a human wave in a stadium at a sporting event. Accordingly, implementations of the invention provide a way of displaying images (e.g., advertising) in a crowd, through coordinating the images displayed across multiple image-enabled clothing articles.

Figure 7:
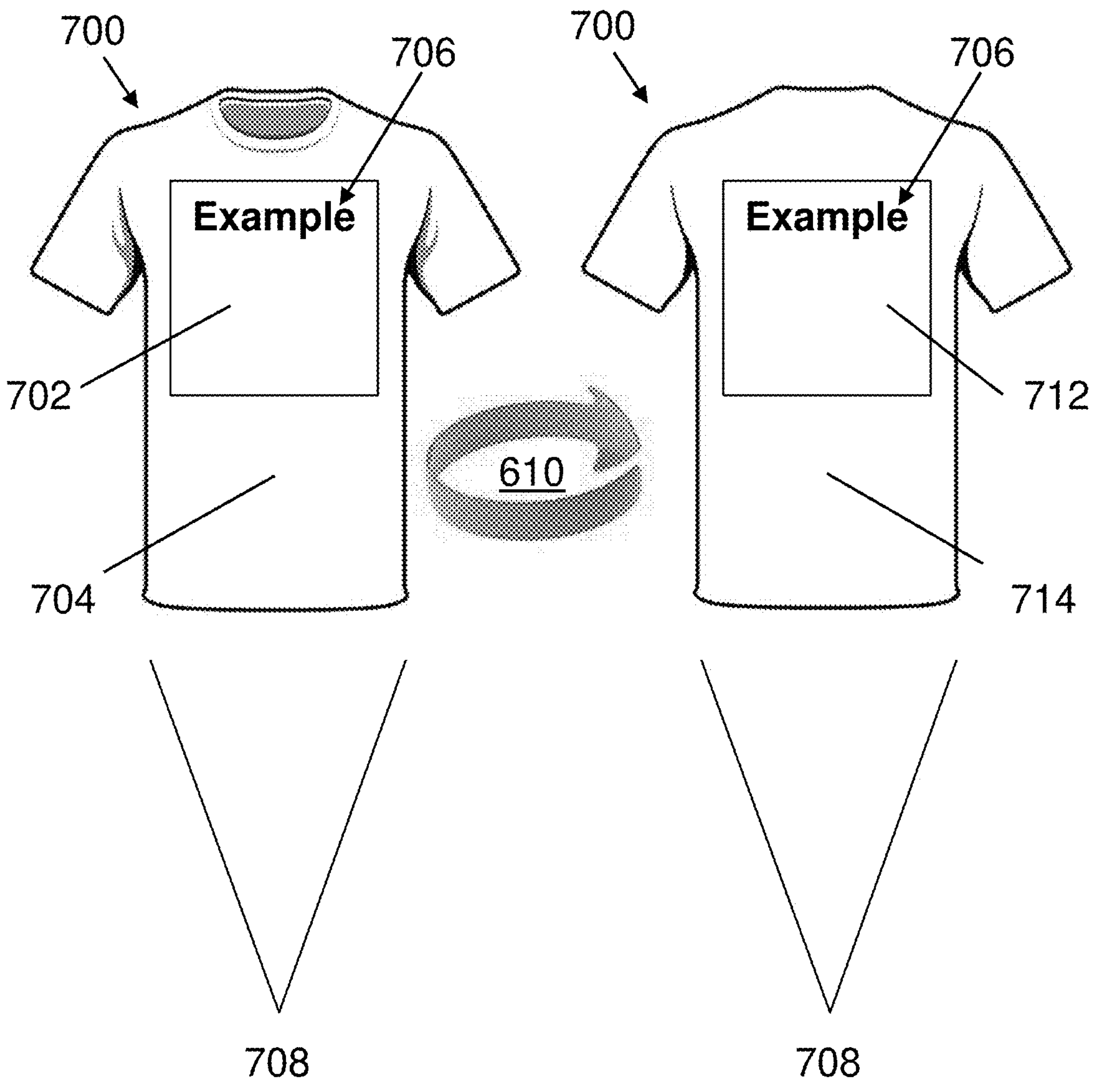
FIG. 7 depicts a fixed-perspective display adjustment of an image-enabled clothing article according to embodiments of the invention.

FIG. 7 depicts a fixed-perspective display adjustment of an image-enabled shirt 700 according to embodiments of the invention. Steps represented in FIG. 7 may be carried out in the environment of FIG. 4.

In the example of FIG. 7, a display portion 702 on a front side 704 of the image-enabled shirt 700 displays an image 706 of the text "Example". Reference 708 in FIG. 7 represents a fixed point, which may be a viewing perspective of an observer. In the example of FIG. 7, a wearer of the image-enabled shirt 700 turns 180 degrees as indicated at 710, which is sensed by a grid of sensors (e.g., sensor grid 430 of FIG. 4) of the image-enabled shirt 700. In response to the 180-degree motion sensed by the grid of sensors, the image-enabled shirt 700 performs fixed-perspective display adjustment to redistribute the image 706 throughout the wearer's turning motion, such that the image 706 travels/transitions from the display portion 702 on the front side 704 of the image-enabled shirt 700, to a display portion 712 on a back side 714 of the image-enabled shirt 700. The movement of the image 706 may be based on a speed or velocity of the movement 610. With this fixed-perspective display adjustment, a viewing perspective of the image 706 is maintained throughout the motion of the wearer. In other words, the relationship between the fixed point 708 and the viewing perspective of the image 706 does not substantially change as the wearer moves.

Figure 8A:
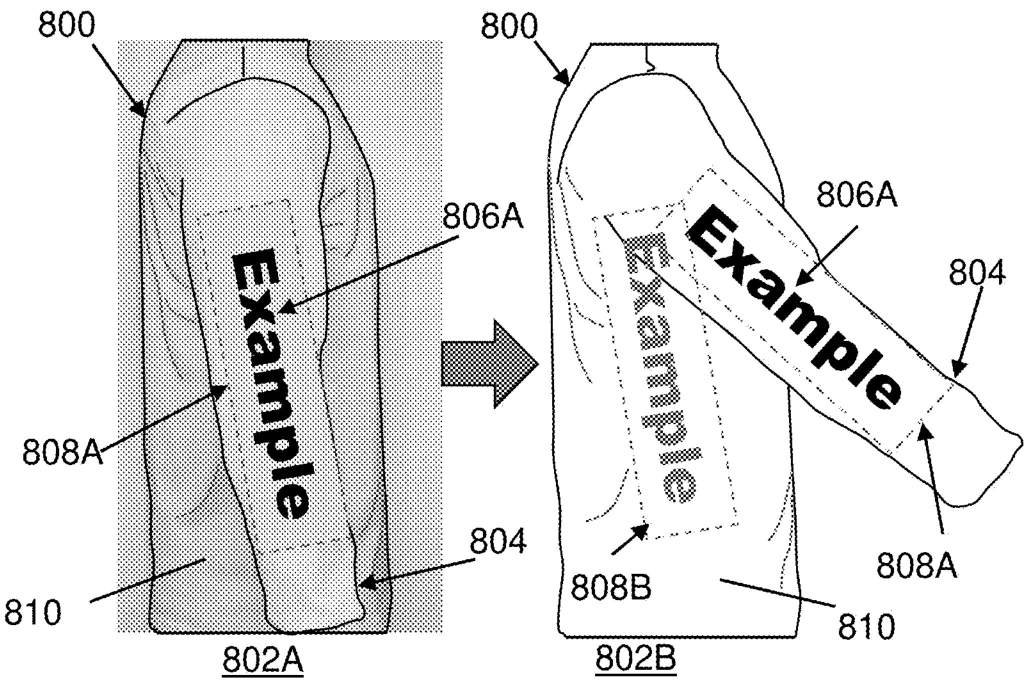
FIGS. 8A-8B depict an exemplary use-scenario using fixed-perspective display adjustment according to embodiments of the invention.
Figure 8B:
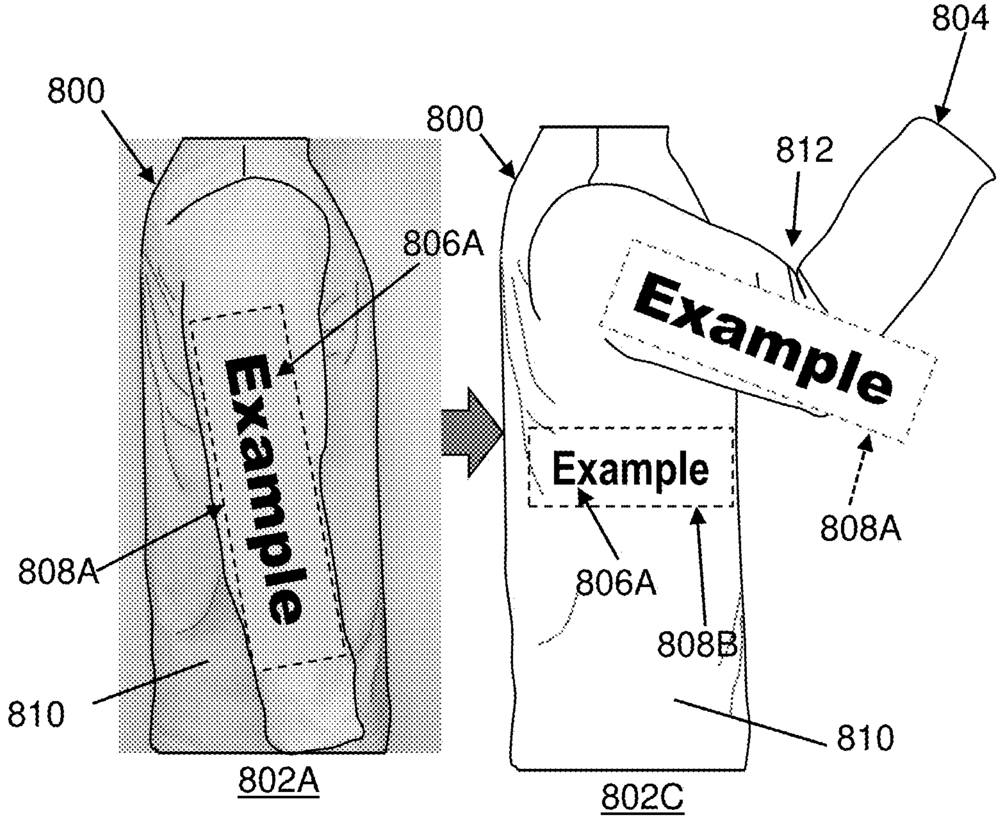

FIGS. 8A-8B depict an exemplary use-scenario using fixed-perspective display adjustment according to embodiments of the invention. Steps discussed with respect to FIGS. 8A-8B may be carried out in the environment of FIG. 4.

FIG. 8A shows an image-enabled shirt 800 in a first position 802A with an arm 804 of the image-enabled shirt 800 positioned in a resting position next to the body of a wearer, and in a second position 802B wherein the arm 804 is in an extended raised position. In this example, an image "Example" maintains a first display configuration 806A along a length of the arm 804 as the arm moves from the first position 802A to the second position 802B when a system according to embodiments of the invention does not detect any obscured portions of the display area 808A over which the image "Example" is displayed. In another example, a system according to embodiments of the invention maintains the image "Example" in an essentially centered position down the side of the image-enabled shirt 800 as the wearer raises their arm from the first position 802A to the second position 802B as depicted at 808B, such that the image "Example" extends over an area 808B encompassing a portion of the arm 804 and a portion of the body 810.

FIG. 8B again shows the image-enabled shirt 800 in the first position 802A with the arm 804 of the image-enabled shirt 800 positioned in a resting position next to the body 810 of a wearer. However, in the example of FIG. 8B, the wearer moves the arm 804 from the first position 802A to a second position 802B wherein an elbow of the user is bent, causing the arm 804 of the image-enabled shirt 800 to fold over itself at 812, and to effectively change the length of the display area 808A such that the current display of the image "Example" cannot be maintained. In this example, a system according to embodiments of the invention detects that the position of the arm 804 interferes with the image "Example" as currently displayed, and implements a fixed-perspective display adjustment to maintain the viewing perspective of the image "Example" along the side of the wearer, by rotating, resizing, and repositioning the image "Example" to display over another portion 808B of the image-enabled shirt 800.

Figure 9:
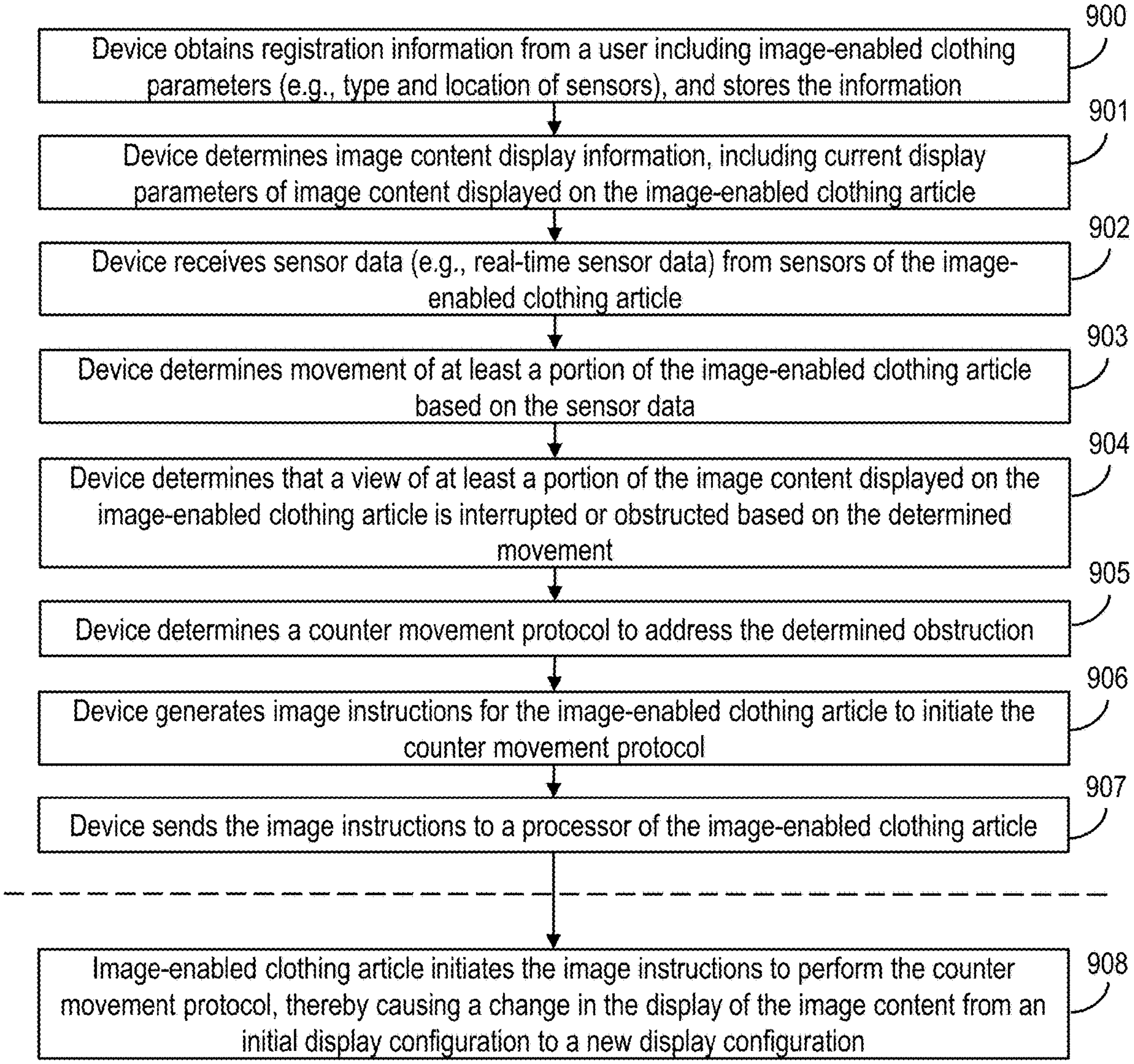
FIG. 9 shows a flowchart of an exemplary method in accordance with aspects of the invention.

FIG. 9 shows a flowchart of an exemplary method in accordance with aspects of the present invention. Steps of the method may be carried out in the environment of FIG. 4 and are described with reference to elements depicted in FIG. 4.

At step 900, the image distribution device 406 obtains registration information from a user including image-enabled clothing article parameters, and stores the registration information in a data store (e.g., the article parameter module 442). In embodiments, the parameters of an image-enabled clothing article 404 include type of sensors (e.g., 428A, 428B) and location of the sensors on the image-enabled clothing article 404. In embodiments, the parameters of the image-enabled clothing article 404 enable the image distribution device 406 to determine locations of sensors (e.g., 428A, 428B) in relationship to boundaries of the image-enabled clothing article 404, and enable detection of overlapping areas of the image-enabled clothing article 404. In implementations, the registration information includes wearer/user identification information (e.g., login information, user parameter data and/or image-enabled clothing article information) enabling the image distribution device 406 to identify a wearer/user and to determine stored registration information associated with the wearer/user (e.g., configurable rules). In aspects of the invention, the image distribution device 406 obtains the registration information directly from an image-enabled clothing article 404, or from a client device 408. In embodiments, the registration module 443 of the image distribution device 406 implements step 900.

At step 901, the image distribution device 406 determines image content display information for an active image-enabled clothing article 404 (e.g., an image-enabled clothing article 404 actively displaying image content). In embodiments, the image content display information indicates what image content (e.g., 424, 426) is being displayed, and the location(s) of the displayed image content on the image-enabled clothing article 404. The location may identify one or more portions of a display area generating the displayed image content. For example, the location information may include location of individual LEDs utilized to generate respective pixels of an image. It should be understood that more than one clothing article 404 may be utilized to display image content according to embodiments discussed herein. However, for simplicities sake, only a single clothing article 404 will be referenced in the method of FIG. 9. In aspects of the invention, the image distribution device 406 obtains the image content display information directly from an image-enabled clothing article 404, from a client device 408, or from a data store of the image distribution device 406. In embodiments, the controller module 440 of the image distribution device 406 implements step 901.

At step 902, the image distribution device 406 receives sensor data (e.g., in real time) from sensors (e.g., 428A, 428B) of the image-enabled clothing article 404. As noted above, the sensors may be location-based sensors (e.g., 5G required to exact location), motion-based sensors (e.g., gyroscopes), or a combination of both, for example. In aspects of the invention, the image distribution device 406 obtains the sensor data directly from the sensors of the image-enabled clothing article 404, or through a client device 408 that first receives the sensor data from the sensors of the image-enabled clothing article 404. In embodiments, the controller module 440 of the image distribution device 406 implements step 902.

At step 903, the image distribution device 406 determines movement of at least a portion of the image-enabled clothing article 404 based on the sensor data. In embodiments, the image distribution device 406 determines a three-dimensional contour map or grid showing a three-dimensional arrangement of material of the image-enabled clothing article 404 based on the sensor data from sensors located within the multiple portions of the image-enabled clothing article 404, wherein the three-dimensional grid or map indicates the physical position of the multiple portions with respect to one another. For example, the image distribution device 406 may obtain sensor data from a grid of sensors 430 within the image-enabled clothing article 404. Various method of generating a three-dimensional grid or map may be utilized, and the invention is not intended to be limited to a particular method of generating a three-dimensional grid or map. In embodiments, the image generating module 441 of the image distribution device 406 implements step 903.

At step 904, the image distribution device 406 determines that a view of at least a portion of the image content (e.g., 424, 426) displayed on the image-enabled clothing article 404 is interrupted or obstructed based on the determined movement at step 903, parameters of the image-enabled clothing article 404 (e.g., location of sensors, dimensions of article, etc.) and display information (e.g., a location of the currently displayed image content, size of the image content displayed, etc.). In aspects of the invention, the image distribution device 406 determines that visibility of at least a portion of image content displayed on a first area of the image-enabled clothing article is obstructed from a first point of view based on the determined movement. The first point of view may be any fixed position in space (e.g., three-dimensional space). In embodiments, the image distribution device 406 is configured to received location information (e.g., GPS information) of people or devices within a predetermined distance from the image-enabled clothing article 404 and determine the first point of view based on the information. For example, the image generating module 441 may be configured to determine a location for the first point of view based on maximizing the number of people or devices surrounding that location in order to maximize the potential number of viewers of the image content displayed on the image-enabled clothing article 404.

In one example, the image distribution device 406 determines that a view of at least a portion of the image content displayed is obscured by another portion of the image-enabled clothing article 404 due to a fold or bend in the image-enabled clothing article 404. See, for example, fold 616 in FIG. 6B. In a second example, the image distribution device 406 determines that a view of at least a portion of the image content displayed is obscured by another portion of the image-enabled clothing article 404 that is between a fixed perspective or viewing point and the portion of the image content being obstructed. This may be due to an arm of an image-enabled shirt blocking a display on a body portion of the image-enabled shirt, for example. In a third example, the image distribution device 406 determines that a view of at least a portion of the image content displayed is interrupted by a change in the shape of the display portion. See, for example, FIG. 8B showing movement of the arm 804 changing an effective length of a display area 808A. In a fourth example, the image distribution device 406 determines that a view of at least a portion of the image content displayed is obscured when image content on a display rotates or otherwise moves out of viewing range of a fixed perspective or viewing point, such as when a wearer/user of an image-enabled clothing article turns. See the example of FIG. 7.

At step 905, the image distribution device 406 determines a counter movement protocol to address/remediate the determined obstructions of the displayed image content. In implementations, the image distribution device 406 generates counter movement protocol to adjust the display of the image content on the image-enabled clothing article from a first area of the image-enabled clothing article comprising a first set of portions (e.g., a first set of LEDs) to a second area of the image-enabled clothing article comprising a second set of portions (e.g., a second set of LEDs). The counter movement protocol may be based on parameters of the image-enabled clothing article (e.g., dimensions of the article, location of display areas, location of individual LEDs or other image-generating technology, etc.). The counter movement may also be based on current image display information, including the location of currently displayed image content, imaging technology currently in use (e.g., active LEDs illuminating an image), etc. In aspects of the invention, the counter movement protocol rotates content to match a determined degree of movement of the image-enabled clothing article, or a portion thereof. In aspects of the invention, the counter movement protocol moves content to match a determined speed of movement of the image-enabled clothing article, or a portion thereof. In embodiments, the image generating module 441 of the image distribution device 406 implements step 905.

At step 906, the image distribution device 406 generates image instructions for the image-enabled clothing article to initiate the counter movement protocol determined at step 905. In implementations, the instructions cause the image-enabled clothing article 404 to adjust the display of an image content (e.g., 424, 426) on the image-enabled clothing article 404 from a first area of the image-enabled clothing article comprising a first set of portions (e.g., a first set of LEDs) to a second area of the image-enabled clothing article comprising a second set of portions (e.g., a second set of LEDs). In implementations, the instructions cause the image content to remain the same or substantially the same as before the adjustment. In other implementations, the instructions cause the image content to be rotated, resized, or otherwise reformatted from a first configuration to a second configuration (e.g., to fit the second area of the image-enabled clothing article). In embodiments, the image generating module 441 implements step 906.

At step 907, in implementations, the image distribution device 406 sends the image instructions to a processor 422 of the image-enabled clothing article 404 for execution by the image-enabled clothing article 404. In embodiments, the controller module 440 implements step 907.

At step 908, the image-enabled clothing article 404 initiates or executes the image instructions received from the image distribution device 406 to perform the counter movement protocol, thereby causing a change in the display of image content from an initial display configuration to a new display configuration. In implementations, the display of the image content moves from a first area of the image-enabled clothing article comprising a first set of portions (e.g., a first set of LEDs) to a second area of the image-enabled clothing article comprising a second set of portions (e.g., a second set of LEDs). In embodiments, the processor 422 of the image-enabled clothing article 404 implements step 908. In some embodiments where the image distribution device 406 is part of an image-enabled clothing article 404, the control module 440 causes the processor 422 to initiate the image instructions from the image generating module 441.

In certain implementations, the image-enabled clothing article 404 may track data regarding visibility of image content for reporting to a third party (e.g., an advertiser/owner of the third-party server 410). In embodiments, the registration module 443 may track image content displayed by different image-enabled clothing articles 404, how long the content is displayed by the image-enabled clothing articles 404, and/or the occurrence and/or duration of any interruptions in the visibility of the image content displayed (e.g., determined obstruction events), and may utilize the information for data analytics purposes and reporting purposes. For example, in systems where advertisers pay wearer/users of image-enabled clothing articles based on the image content displayed, the image distribution device 406 may be in the form of a cloud-based server providing image content information (tracking information) to advertisers that provide the image content displayed by the wearer/users, so that payment to the wearer/user may be calculated (e.g., based on unobstructed display of image content per minute).

Various method(s) may be used for temporal or content exposure measurements. In implementations, the image distribution device 406 determines if the display of content is based on raw time (minutes of exposure) or a counter based on exposure feedback to a human count. In embodiments, the image distribution device 406 determines a number of unique people that may be exposed to the content through video or sensor feeds (e.g., by detecting local mobile devices, etc.) and only displays the content based on the exposure metric allowed (e.g., based on user configured rules). Once the counter is reached (time or user count based—or both), the image distribution device 406 may send instructions to an image-enabled clothing article to alter the content to a new piece of content based on the user's current or predicted environment.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprises one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

determining, by a computing device, movement of at least a portion of an image-enabled clothing article based on real-time sensor data from sensors of the image-enabled clothing article;

determining, by the computing device, that a view of at least a portion of image content displayed on the image-enabled clothing article is obstructed based on the determined movement, parameters of the image-enabled clothing article, and image display information of the image-enabled clothing article;

generating, by the computing device, image instructions that cause the display of the image content on the image-enabled clothing article to move from a first area of the image-enabled clothing article comprising a first set of portions to a second area of the image-enabled clothing article comprising a second set of portions; and generating, by the computing device, a three-dimensional contour map of the image-enabled clothing article based on the real-time sensor data, wherein the determining that the view of at least a portion of image content displayed on the image-enabled clothing article is obstructed is based on the three-dimensional contour map.

2. The method of claim 1, wherein the computing device is part of the image-enabled clothing article, the method further comprising executing, by the image-enabled clothing article, the image instructions, whereby the image content on the image-enabled clothing article moves from the first area of the image-enabled clothing article comprising the first set of portions to the second area of the image-enabled clothing article comprising the second set of portions.

3. The method of claim 1, further comprising sending, by the computing device, the image instructions to the image-enabled clothing article via a network connection.

4. The method of claim 1, wherein:

the first area of the image-enabled clothing article comprises a first set of portions and the second area of the image-enabled clothing article comprising a second set of portions;

each of the first set of portions and the second set of portions comprises multiple light emitting diodes (LEDs); and the image content is created by one or more of the LEDs of the image-enabled clothing article, wherein the one or more LEDs are utilized to generate respective pixels of an image.

5. The method of claim 1, wherein the sensors of the image-enabled clothing article are motion sensors selected from the group consisting of: gyroscope sensors, fifth generation (5G) enabled sensors, and combinations thereof.

6. The method of claim 1, wherein the determining that the view of at least a portion of image content displayed on the image-enabled clothing article is obstructed comprises determining that material of the image-enabled clothing article has moved such that it overlaps and obstructs the view of at least a portion of the image content displayed on the image-enabled clothing article.

7. The method of claim 1, further comprising receiving, by the computing device, the real-time sensor data from the image-enabled clothing article via a network connection.

8. The method of claim 1, wherein the image display information of the image-enabled clothing article includes locations of the sensors on the image-enabled clothing article.

9. The method of claim 1, wherein the computing device includes software provided as a service in a cloud environment.

10. A computer program product comprising one or more computer readable storage media having program instructions collectively stored on the one or more computer readable storage media, the program instructions executable by a computing device to:

determine movement of at least a portion of an image-enabled clothing article based on real-time sensor data from sensors of the image-enabled clothing article;

determine that a view of at least a portion of image content displayed on the image-enabled clothing article is obstructed based on the determined movement, a location of the image content displayed and locations of the sensors on the image-enabled clothing article;

in response to the determining that the view of the at least a portion of the image content displayed on the image-enabled clothing article is obstructed, generate image instructions that cause the display of the image content on the image-enabled clothing article to move from a first area of the image-enabled clothing to a second area of the image-enabled clothing article; and generate a three-dimensional contour map of the image-enabled clothing article, wherein the determining that the view of at least a portion of image content displayed on the image-enabled clothing article is obstructed is based on the three-dimensional contour map.

11. The computer program product of claim 10, wherein the computing device is part of the image-enabled clothing article, and the program instructions are further executable to cause the computing device to initiate the image instructions, whereby the image content on the image-enabled clothing article moves from the first area of the image-enabled clothing article to the second area of the image-enabled clothing article.

12. The computer program product of claim 10, wherein the program instructions are further executable to cause the computing device to send the image instructions to the image-enabled clothing article via a network connection.

13. The computer program product of claim 10, wherein the determining that the view of at least a portion of image content displayed on the image-enabled clothing article is obstructed comprises determining that material of the image-enabled clothing article has moved such that it overlaps and obstructs the view of at least a portion of the image content displayed on the image-enabled clothing article.

14. The computer program product of claim 13, wherein the generating the three-dimensional contour map of the image-enabled display article is based on the real-time sensor data.

15. A system comprising:

a processor, a computer readable memory, one or more computer readable storage media, and program instructions collectively stored on the one or more computer readable storage media, the program instructions executable by a computing device to:

determine movement of at least a portion of an image-enabled clothing article based on real-time sensor data from sensors of the image-enabled clothing article;

determine that visibility of at least a portion of image content displayed on a first area of the image-enabled clothing article is obstructed from a first point of view based on the determined movement;

in response to the determining that the visibility of the at least a portion of the image content displayed on the image-enabled clothing article is obstructed, generate image instructions that cause the image-enabled clothing article to perform a counter movement protocol to display the image content in a second area of the image-enabled clothing article, resulting in displayed image content that is fully visible from the first point of view; and generate a three-dimensional contour map of the image-enabled clothing article, wherein the determining that the view of at least a portion of image content displayed on the image-enabled clothing article is obstructed is based on the three-dimensional contour map.

16. The system of claim 15, wherein the computing device is part of the image-enabled clothing article, and the program instructions are further executable to cause the computing device to execute the image instructions, whereby the counter movement protocol is performed.

17. The system of claim 15, wherein the program instructions are further executable to cause the computing device to send the image instructions to the image-enabled clothing article via a network connection.

18. The system of claim 15, wherein the determine that visibility of at least a portion of image content displayed on the first area of the image-enabled clothing article is obstructed from a first point of view is based on determining that material of the image-enabled clothing article has moved such that it overlaps and obstructs the visibility of the at least a portion of the image content displayed on the image-enabled clothing article.

19. The system of claim 18, wherein the generating the three-dimensional contour map of the image-enabled display article is based on the real-time sensor data.

* * * * *